US012732241B2

(12) United States Patent
Liu

(10) Patent No.: US 12,732,241 B2
(45) Date of Patent: Sep. 8, 2026

(54) METHODS FOR INFORMATION TRANSMISSION, AND COMMUNICATION DEVICE

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 687 days.

(21) Appl. No.: 18/015,325

(22) PCT Filed: Jul. 14, 2020

(86) PCT No.: PCT/CN2020/101978
§ 371 (c)(1),
(2) Date: Jan. 9, 2023

(87) PCT Pub. No.: WO2022/011577
PCT Pub. Date: Jan. 20, 2022

(65) Prior Publication Data
US 2023/0275630 A1 Aug. 31, 2023

(51) Int. Cl.
*H04B 7/06* (2006.01)
*H04B 7/0404* (2017.01)
*H04B 7/08* (2006.01)

(52) U.S. Cl.
CPC ......... *H04B 7/0608* (2013.01); *H04B 7/0404* (2013.01); *H04B 7/0802* (2013.01)

(58) Field of Classification Search
CPC .. H04B 7/0608; H04B 7/0404; H04B 7/0802; H04B 7/061; H04B 7/0691; H04B 7/0874; H04B 17/382; H04B 17/309; H04B 17/327; H04W 88/06
See application file for complete search history.

(56) References Cited

U.S. PATENT DOCUMENTS 10,405,299 B2 9/2019 Rico Alvarino et al.
10,470,064 B2 11/2019 Davydov et al.
2017/0085309 A1* 3/2017 Pham .................. H04B 7/0478
2018/0152856 A1 5/2018 Davydov et al.
(Continued)

FOREIGN PATENT DOCUMENTS

CN 107624225 A 1/2018
CN 109690968 A 4/2019
(Continued)

OTHER PUBLICATIONS

Rodríguez, Demóstenes Z., et al. "Speech quality assessment in wireless communications with mimo systems using a parametric model." IEEE Access 7 (2019): 35719-35730. (Year: 2019).*
(Continued)

*Primary Examiner* — Sharad Rampuria
(74) *Attorney, Agent, or Firm* — Arch & Lake LLP; Hao Tan; Shen Wang

(57) ABSTRACT

A method for information transmission is performed by a user equipment (UE). The method comprises: determining reception quality parameters for at least two antenna groups, each antenna group comprising at least two antennas; and sending a first message for indicating at least one of the antenna groups and the reception quality parameters.

14 Claims, 4 Drawing Sheets

(56) References Cited

U.S. PATENT DOCUMENTS

| | | | | |
|---|---|---|---|---|
| 2021/0226333 | A1* | 7/2021 | Liu | H04B 7/0874 |
| 2023/0081552 | A1* | 3/2023 | Chou | H04B 7/0639<br>370/329 |
| 2025/0105890 | A1* | 3/2025 | Huang | H04W 72/51 |

FOREIGN PATENT DOCUMENTS

| | | | |
|---|---|---|---|
| CN | 111277314 | A | 6/2020 |
| EP | 2810382 | A1 | 12/2014 |
| WO | 2012146982 | A1 | 11/2012 |
| WO | 2018172823 | A1 | 9/2018 |

OTHER PUBLICATIONS

International Search Report issued in Application No. PCT/CN2020/101978, dated Apr. 6, 2021, with English translation, (4p).
Extended European Search Report issued in Application No. 20945668.0, dated Apr. 24, 2023, (10p).
CNOA of Application No. 202080001532.0 dated on Jun. 4, 2022 with English translation, (17p).
INOA of Application No. 202347002263 dated on Aug. 4, 2023, with partial English translation, (6p).
VIVO, "Further discussion on Multi-Beam Operation" 3GPP TSG RAN WG1 #98, R1-1908167, Prague, CZ, Aug. 26-301, 2019, (12p).
ZTE, et al., "WF on group based beam reporting for NR MIMO", 3GPP TSG RAN WG1 Meeting #88, R1-1703997, Athens, Greece, Feb. 13-17, 2017, (6p).

* cited by examiner antenna 1
antenna 2
antenna 3
antenna M-2
antenna M-1
antenna M
Switch
1
2
N-1
N
baseband

METHODS FOR INFORMATION TRANSMISSION, AND COMMUNICATION DEVICE

CROSS-REFERENCE TO RELATED APPLICATION

This application is the U.S. national phase application of International Application No. PCT/CN2020/101978, filed on Jul. 14, 2020, the entire disclosure of which is incorporated herein by reference.

TECHNICAL FIELD

The disclosure relates to a field of communication technologies, but is not limited to the field of communication technologies, in particular to a method and an apparatus for information transmission, a communication device and a storage medium.

BACKGROUND

For non-millimeter-wave frequency bands, more antennas are currently designed on a multi-mode user equipment (UE). For example, 4, 6, or 8 antennas are designed on the multi-mode UE. For millimeter-wave frequency bands, a multi-antenna design of the multi-mode UE is a multi-panel antenna design. The more antennas, the higher the associated hardware cost in addition to the cost of the antenna itself. For example, when a multi-mode UE wants to obtain a diversity gain of downlink 4 antennas in a certain mode, the multi-mode UE needs to support simultaneous reception of 4 antennas. For 4-antenna reception, it needs to add baseband hardware processing units such as channel estimation, signal processing and control, thus increasing costs.

SUMMARY

According to a first aspect of the disclosure, a method for information transmission is performed by a user equipment (UE). The method includes:

- determining reception quality parameters for at least two antenna groups, in which each antenna group includes at least two antennas; and
- sending a first message that indicates at least one of the antenna groups and the reception quality parameters.

According to a second aspect of the disclosure, a method for information transmission is performed by a server. The method includes:

- receiving at least one first message sent by at least one user equipment (UE) for indicating at least one of antenna groups and reception quality parameters, in which each antenna group includes at least two antennas.

According to a third aspect of the disclosure, there is provided a communication device, including a processor, and a memory stored with a program. When the program is run by the processor, the processor is configured to determine reception quality parameters for at least two antenna groups, wherein each antenna group comprises at least two antennas; and send a first message that indicates at least one of the antenna groups and the reception quality parameters.

It should be understood that the above general description and the following detailed description are exemplary and explanatory, which are not intended to limit the embodiments of the disclosure.

BRIEF DESCRIPTION OF THE DRAWINGS

The accompanying drawings, which are incorporated in and constitute a part of this specification, illustrate embodiments consistent with the disclosure and serve to explain the principles of the embodiments of the disclosure together with the description.

DETAILED DESCRIPTION

The embodiments may be described in detail herein, examples of which are illustrated in the accompanying drawings. Where the following description refers to the drawings, the same numerals in different drawings refer to the same or similar elements unless otherwise indicated. The implementations described in the embodiments below are not intended to represent all implementations consistent with the disclosure. Rather, they are merely examples of apparatuses and methods consistent with some aspects of the disclosure as recited in the appended claims.

Terms used in the embodiments of the present disclosure are for the purpose of describing specific embodiments, and are not intended to limit the embodiments of the present disclosure. As used in the examples of the disclosure and the appended claims, the singular forms “a/an”, “said” and “the” are also intended to include the plural forms unless the context clearly dictates otherwise. It should also be understood that the term “and/or” as used herein refers to and includes any and all possible combinations of one or more of the associated listed items.

It should be understood that although the terms first, second, and third may be used in this disclosure to describe various information, the information should not be limited to these terms. These terms are used to distinguish the same type of information from each other. For example, without departing from the scope of the disclosure, first information may also be referred to as second information, and similarly, the second information may also be referred to as the first information. Depending on the context, the term “if” as used herein may be interpreted as “when”, “in a case that . . . ” or “in response to determining”.

Figures 1, 2:
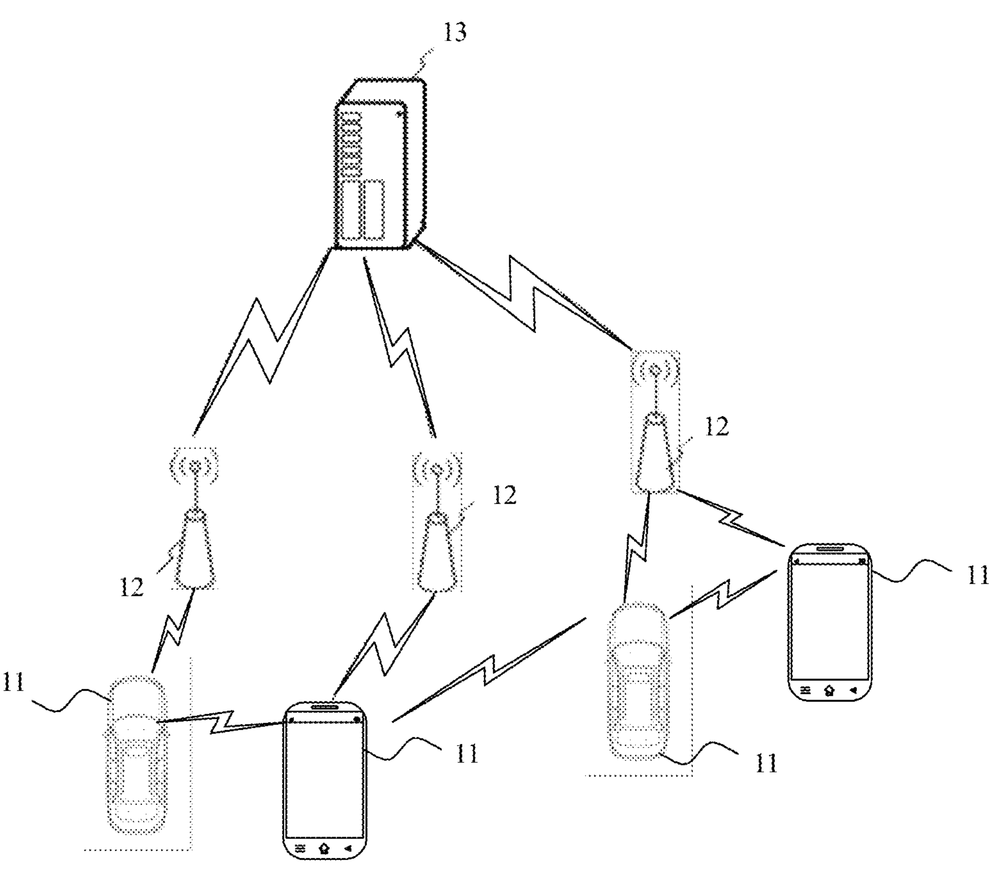
FIG. 1 is a structural schematic diagram illustrating a communication system according to an embodiment.
FIG. 2 is a schematic diagram illustrating antenna selection according to an embodiment.

Referring to FIG. 1, which is a structural schematic diagram illustrating a wireless communication system according to embodiments of the disclosure. As illustrated in FIG. 1, the wireless communication system is a communication system based on cellular mobile communication technologies. The wireless communication system may include several terminals 11 and several base stations 12.

The terminal 11 may be a device providing voice and/or data connectivity for a user. The terminal 11 may communicate with one or more core networks via a radio access network (RAN). The terminal 11 may be an Internet of Things terminal, such as, a sensor device, a mobile phone (or a "cellular" phone), or a computer with the Internet of Things terminal. The terminal 11 may be a fixed, portable, pocket-sized, handheld, computer-built or vehicle-mounted device, such as, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may be an unmanned aerial vehicle. Alternatively, the terminal 11 may be a vehicle-mounted/on-board device, such as, a driving computer with a wireless communication function, or a wireless communication device with an external driving computer. Alternatively, the terminal 11 may be a roadside device, such as a street lamp, a signal lamp or other roadside devices with the wireless communication function.

The base station 12 may be a network-side device in the wireless communication system. The wireless communication system may be the fourth generation mobile communication (4G) system, also known as a long term evolution (LTE) system. Alternatively, the wireless communication system may be the fifth generation (5G) system, also known as a new radio (NR) system or a 5G NR system. Alternatively, the wireless communication system may be a next-generation system following the 5G system. An access network in the 5G system may be called a new generation-radio access network (NG-RAN), or a machine-type communication (MTC) system.

The base station 12 may be an evolved Node B (eNB) employed in the 4G system. Alternatively, the base station 12 may be a base station (gNB) with a centralized distributed architecture in the 5G system. The base station 12 generally includes a central unit (CU) and at least two distributed units (DUs) when employing the centralized distributed architecture. There are protocol stacks of a packet data convergence protocol (PDCP) layer, a radio link control (RLC) layer and a media access control (MAC) layer provided in the CU. A protocol stack of a physical layer (PHY) is provided in the DU. The specific implementation of the base station 12 is not limited in embodiments of the disclosure.

A wireless connection may be established between the base station 12 and the terminal 11 via a wireless air interface. In different implementations, the wireless air interface is a wireless air interface based on the 4G mobile communication network technology standard. Alternatively, the wireless air interface is a wireless air interface based on the 5G mobile communication network technology standard. For example, the wireless air interface is a new air interface. Alternatively, the wireless air interface may also be a wireless air interface based on a next generation mobile communication network technology standard following the 5G standard.

In some embodiments, an end-to-end (E2E) connection may also be established between terminals 11, for example, vehicle-to-vehicle (V2V) communication, vehicle to Infrastructure (V2I) communication, vehicle to pedestrian (V2P) communication and other scenes in vehicle to everything (V2X) communication.

In some embodiments, the wireless communication system may also include a network management device 13.

The several base stations 12 are respectively connected to the network management device 13. The network management device 13 may be a core network device in the wireless communication system. For example, the network management device 13 may be a mobility management entity (MME) in an evolved packet core network (EPC). Alternatively, the network management device may be other core network device, such as a serving gateway (SGW), a public data network gateway (PGW), a policy and charging rule function (PCRF) or a home subscriber server (HSS). The implementation form of the network management device 13 is not limited in embodiments of the disclosure.

The execution body involved in the embodiments of the disclosure includes, but is not limited to: a wireless communication UE such as a mobile phone terminal with multiple antennas, and a base station.

An application scenario of the embodiments of the present disclosure is taking non-millimeter waves as an example. As shown in FIG. 2, a switch may be directly set on the antennas and the baseband paths. Here, a number M of antennas is greater than a number N of baseband channels. The switch may select a certain number of antennas to be connected to the baseband, for example, only two antennas may be selected to be connected to the baseband. In this way, the baseband cost and the baseband processing complexity may be saved.

A static selection method is usually used to select an antenna to access the baseband, or a static selection method after comparing reference signal receiving powers (RSRPs) during an initial access. The static selection method refers to adopting fixed antenna groups for different frequency bands. The static selection method after comparing the RSRPs during the initial access refers to that, the UE compares the RSRPs of different antenna groups and selects an antenna group with the optimal RSRP when the UE initially accesses the network, which will not change during the subsequent movement. Both methods are static selections, and cannot be dynamically adapted to changes in network conditions, so as to achieve an optimal performance.

Figure 3:
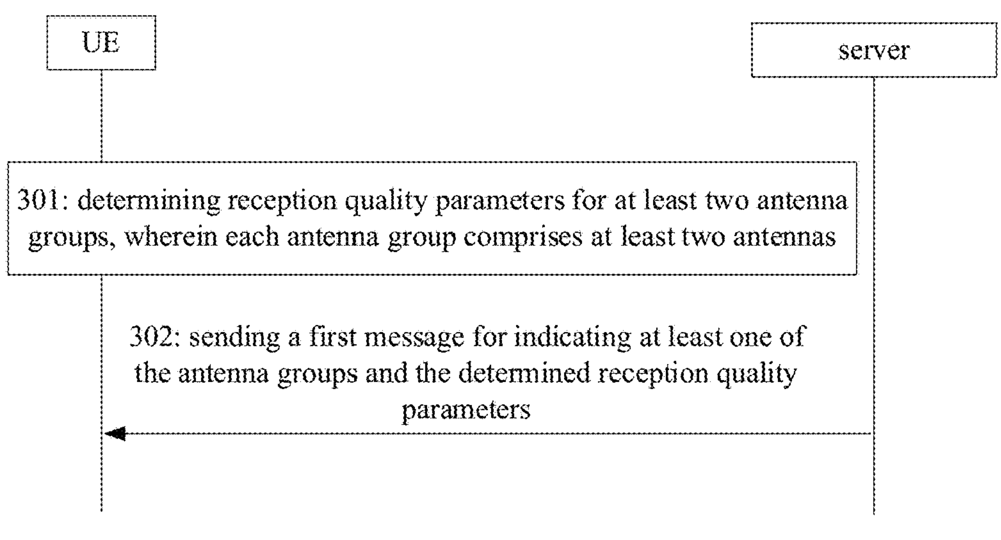
FIG. 3 is a schematic flowchart illustrating a method for information transmission according to an embodiment.

As shown in FIG. 3, the embodiment provides a method for information transmission, which may be applied to a wireless communication UE, including the following steps at 301-302.

At 301: reception quality parameters for at least two antenna groups are determined, where each antenna group includes at least two antennas.

At 302: a first message is sent that indicates at least one of the antenna groups and the determined reception quality parameters.

Here, the UE may be a multi-mode UE such as a mobile phone terminal in cellular mobile communication. The multi-mode UE may be a UE that supports multiple frequency bands for communication, or supports different cellular mobile communication technologies.

The antenna may be a physical antenna, or an antenna unit in an antenna array or an antenna panel.

Here, the antenna group may be a multiple input multiple output (MIMO) antenna group. An antenna group may have at least two antennas. The at least two antenna groups may be all possible antenna groups of the UE. The different antenna groups may also be predetermined antenna groups, for example, the predetermined antenna groups may be all antenna groups in which a number of antennas is 2.

Different antenna groups have different receiving capabilities for wireless signals in different frequency bands and/or different communication standards.

Here, the UE may measure the reception quality parameters corresponding to different antenna groups, in which the reception quality parameters may be used to characterize the quality of wireless signals received by the UE. The reception quality parameters may include a received signal strength indication (RSSI) and/or a reference signal receiving power (RSRP), and the like.

In an example, the UE may use different antenna groups to measure a reception quality parameter of a synchronization signal block (SSB) received.

The first message may indicate correspondences between different antenna groups and respective corresponding reception quality parameters. An antenna identifier number may be set for each antenna, or combination identifier numbers may be set for different antenna groups. The antenna group may be indicated by the antenna identifier number contained in the antenna group or the combination identification number of the antenna group in the first message. The first message may be one or more correspondences between one or more different antenna groups and their respective corresponding reception quality parameters.

In an example, the first message may be in the form of a sequence, for example, {SSB-RSRP, antenna group}, where SSB-PRSP represents the RSRP of the SSB measured by using the antenna group in the expression.

The UE may forward the first message to the server through the base station. Here, the server may be a base station server, a core network server, etc. and may also be a server set on a network such as a wide area network for processing the first message.

The server may determine a signal receiving condition of the UE based on the first message, and may adjust the communication network based on the first message. For example, the server may adjust a signal transmission state of the base station; may also select an antenna group suitable for the current network for the UE based on the first message, so as to reduce the load caused by the UE selecting the antenna group.

In this way, the UE reports the first message that indicates different antenna groups and the measured reception quality parameters to the server. The first message may be used as a basis for the server to instruct the UE to select an appropriate antenna group, or to adjust the communication network, etc., thus reducing the selected antenna group that does not meet the requirements of the communication scenario and improving the communication reliability.

In an embodiment, antennas in different antenna groups are not completely the same or are completely different, and/or signal receiving paths of different antenna groups are not completely the same or are completely different.

Here, the antennas in different antenna groups may be different, or the antennas in different antenna groups may be identical but the signal receiving paths connected to the antennas are different, or the antennas in different antenna groups and the signal receiving paths connected to the antennas may be different. The antennas that may be different in different antenna groups, may be that: the number of antennas is different, and/or the selected antennas are different.

As shown in FIG. 2, one antenna group has less than or equal to N antennas, where N is less than or equal to a total number M of antennas of the UE, and M and N are positive integers. The UE may have M antennas. The UE may select antennas connected to the baseband through the switch between the antennas and the base station. Here, the number of antennas connected to the baseband may be less than or equal to N. Here, N is less than or equal to the total number M of antennas of the UE. For example, N may be a number of switch channels of the selection switch. Here, one or more antennas connected to the baseband and selected through the switch between the antennas and the base station are an antenna group.

In an example, if the UE has 6 antennas, 6 antenna groups may be formed when the number of antennas in an antenna group is 1. 15 antenna groups may be formed when the number of antennas in an antenna group is 2. 20 antenna groups may be formed when the number of antennas in an antenna group is 3.

Figure 4:
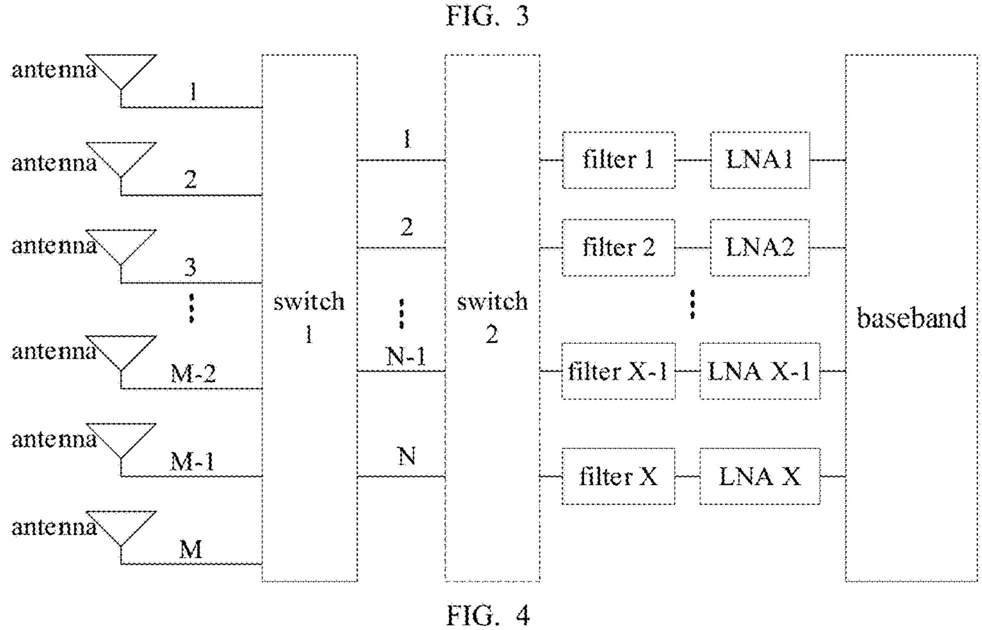
FIG. 4 is a schematic diagram illustrating another antenna selection according to an embodiment.

In the radio frequency front-end block diagram shown in FIG. 4, the UE may have X signal receiving paths, where X is a positive integer greater than or equal to 1. The signal received by the antenna needs to be transmitted to the baseband through a signal receiving path composed of a filter and/or a low noise amplifier and other devices. The signal receiving path connected to each antenna may also be hand over through a switch, so that one antenna may be connected to different signal receiving paths. Different signal receiving paths have different processing capabilities for signals in different frequency bands. An antenna connected to different signal receiving paths may make the RF front-end adapt to signals in different frequency bands. Here, the antennas in the same antenna group may be identical, but the signal receiving paths connected to the antennas may be different, or the antennas in different antenna groups and the signal receiving paths connected to the antennas may be different.

In an embodiment, the first message indicates a cell corresponding to the first message.

In different cells, the reception quality parameters measured by the same antenna group are different. The first message sent by the UE to the server may be identified by using cell identity information, and the server may determine the cell corresponding to the first message based on the cell identity information. The cell identity information may be a cell identity (ID).

In an example, the first message may be in the form of a sequence, for example, {Cell-ID, SSB-RSRP, antenna group}, where Cell-ID indicates the cell corresponding to the first message, and SSB-PRSP indicates the RSRP of the SSB measured by using the antenna group in the expression.

By using the cell identity information to identify the first message, the server may determine the cell corresponding to the first message, and may select the antenna group of the UE for the cell, or adjust the communication network to improve the pertinence of the first message.

In an embodiment, sending the first message that indicates at least one of the antenna groups and the determined reception quality parameters includes:

sending one or more first messages determined for one or more times.

Due to changes in a wireless signal receiving environment, such as changes in surrounding interference conditions, etc. The reception quality parameters measured by the UE at the same location will change.

The UE may perform one or more measurements and obtain multiple first messages. The UE may send the obtained multiple first messages to the server. Here, each first message may include a relationship between different antenna groups and the measured reception quality parameters.

After receiving the multiple first messages, the server may determine, based on the multiple first messages, statistical reception quality parameters corresponding to different antenna groups in a statistical manner.

In this way, the accuracy of the server determining the reception quality parameters corresponding to different antenna groups may be improved.

In an embodiment, the method also includes:

receiving a second message that indicates at least two of the antenna groups and the reception quality parameters, in which the second message is determined based on the first message;

determining, based on the second message, an antenna group for signal transmission.

The second message may indicate correspondences between different antenna groups and respective corresponding reception quality parameters. The second message may be one or more correspondences between one or more different antenna groups and their respective corresponding reception quality parameters.

The server may determine the second message based on the first message. The first message may or may not be the same as the second message.

The second message may be a result obtained by performing statistical processing on the first message. For example, for multiple first messages received, multiple reception quality parameters of the same antenna group may be averaged or weighted averaged. The correspondence between different antenna groups and the calculated reception quality parameters is determined as the second message.

Here, the first message may be the correspondence between one or more different antenna groups and reception quality parameters. The multiple first messages may be first messages respectively measured by one UE for multiple times, and/or first messages measured by multiple same UEs, respectively. Here, the same UEs may be UEs with the same antenna design.

The server may send the second message determined based on the first message to the UE. The UE may determine an antenna group from the second message based on desired reception quality parameters. The antenna group corresponding to the desired reception quality parameters is used for signal transmission. Here, the desired reception quality parameters may be optimal reception quality parameters in the second message.

The server may update the second message based on multiple first messages reported by different UEs, or multiple first messages reported by the same UE. The correspondence between antenna groups and reception quality parameters reflected in the second message is more accurate and time-sensitive. Therefore, the second message is used to determine the antenna group for signal transmission, which may improve the accuracy of selecting an antenna group and thus improve the communication quality.

In an embodiment, receiving the second message that indicates at least two of the antenna groups and the reception quality parameters includes:

receiving a second message that indicates at least two of the antenna groups and reception quality parameter index values, in which different quality parameter index values represent different ranges of reception quality parameters.

Usually, the values of reception quality parameters such as RSSI or RSRP are relatively discrete. For example, the reception quality parameters corresponding to different antenna groups in the second message may be different from the desired reception quality parameters. As such, it may not be possible to determine the antenna group from the second message using the desired reception quality parameters.

Here, the reception quality parameters may be quantified. The server may use the reception quality parameter index values to represent different ranges of reception quality parameters. The reception quality parameter index value may indicate reception quality parameters within a range. The UE may select a desired reception quality parameter index value according to the quality of reception quality parameters indicated by the reception quality parameter index values. For example, a reception quality parameter index value indicating an optimal reception quality parameter may be determined as a desired reception quality parameter index value. The antenna group corresponding to the optimal reception quality parameter is selected for signal transmission. Since the reception quality parameters in the second message are quantized, the situation that the antenna group cannot be determined from the first message may be reduced.

In an embodiment, the reception quality parameter index value is obtained by rounding a quotient of the reception quality parameters divided by a predetermined quantization constant.

Here, the reception quality parameter index value may be obtained by rounding the reception quality parameter divided by the predetermined quantization constant. In this way, a reception quality parameter index value indicating a certain range of reception quality parameters may be obtained.

In an embodiment, the number of antenna groups corresponding to one reception quality parameter index value is less than or equal to a preset number threshold.

If a difference between the reception quality parameters corresponding to different antenna groups is small, there may be multiple reception quality parameters indicated by the reception quality parameter index value, that is, one reception quality parameter index value may correspond to multiple antenna groups. Here, the predetermined quantization constant can be adjusted to narrow the range of reception quality parameters indicated by the reception quality parameter index value, so that the number of antenna groups corresponding to one reception quality parameter index value is less than or equal to the preset number threshold. For example, the preset quantity threshold may be 2.

In an example, as shown in Table 1, the same reception quality parameter index value, that is, one RSRP quantization value corresponds to two antenna groups, i.e., the RSRP quantization value 1 corresponds to antenna group 0 or 1. When the reception quality parameter index value selected by the UE is 1, two antenna groups may be obtained.

TABLE 1

| RSRP quantization value | antenna group |
|---|---|
| 0 | 0 |
| 1 | 1 or 0 |
| . . . | . . . |

In this way, after the UE determines the reception quality parameter index value, the number of antenna groups available for selection is less than or equal to the preset number threshold, and the frequency for the UE to select antenna groups is reduced.

In an embodiment, receiving the second message of antenna groups and reception quality parameters includes:

receiving the second message of a current cell;

In an embodiment, receiving the second message that indicates at least two of the antenna groups and the reception quality parameters includes:

receiving the second message of a current cell;

determining the antenna group for signal transmission based on the second message includes:

determining, based on the second message of the current cell, the antenna group for signal transmission in the current cell.

The first message sent by the UE may use cell identity information to identify the cell. The server may determine the second message of a different cell based on the first message of a different cell.

The server may send a second message about the current cell of the UE to the UE, and the UE may determine an antenna group suitable for the current cell based on the second message.

The server may determine the current cell of the UE based on the cell identity information used in the first message sent by the UE, or the UE may send indication information of the current cell to the server.

In an embodiment, the reception quality parameters include: reference signal receiving powers (RSRPs).

Here, the UE may measure RSRPs corresponding to different antenna groups. The first message of different antenna groups and RSRPs are sent to the server.

RSRP is an average value of RF transmission powers of all reference signals in a passband, which is a key parameter used to indicate the strength of the wireless signal. Using RSRP as the reception quality parameter may more clearly reflect the receiving capabilities of different antenna groups.

Figure 5:
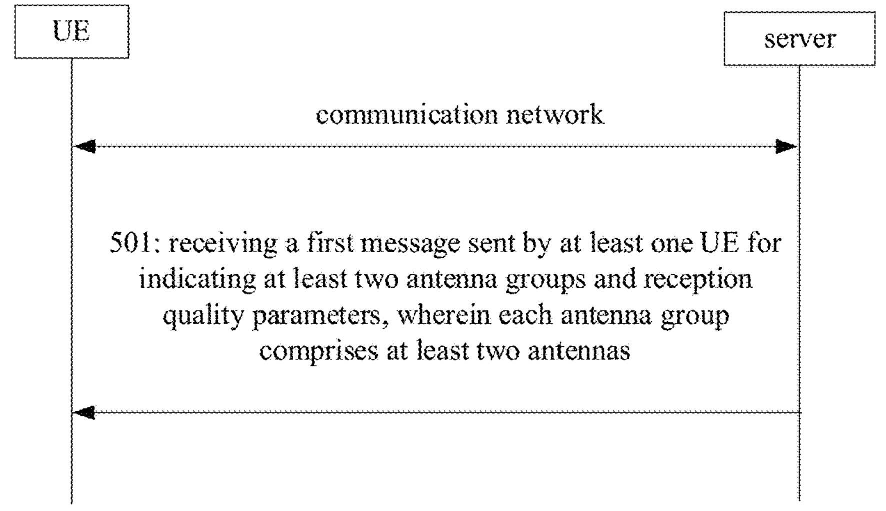
FIG. 5 is a schematic flowchart illustrating another method for information transmission according to an embodiment.

As shown in FIG. 5, the embodiment provides a method for information transmission, which may be applied to a server, including the following step at 501.

At 501: a first message sent by at least one UE is received that indicates at least two antenna groups and reception quality parameters, in which each antenna group includes at least two antennas.

Here, the UE may be a multi-mode UE such as a mobile phone terminal in cellular mobile communication. The multi-mode UE may be a UE that supports multiple frequency bands for communication, or supports different cellular mobile communication technologies.

The antenna may be a physical antenna, or an antenna unit in an antenna array or an antenna panel.

Here, the antenna group may be a MIMO antenna group. An antenna group may have at least two antennas. The at least two antenna groups may be all possible antenna groups of the UE. The different antenna groups may also be predetermined antenna groups, for example, the predetermined antenna groups may be all antenna groups in which a number of antennas is 2.

Different antenna groups have different receiving capabilities for wireless signals in different frequency bands and/or different communication standards.

Here, the UE may measure the reception quality parameters corresponding to different antenna groups, in which the reception quality parameters may be used to characterize the quality of the wireless signals received by the UE. The reception quality parameters may include a received signal strength indication (RSSI) and/or a reference signal receiving power (RSRP), and the like.

In an example, the UE may use different antenna groups to measure a reception quality parameter of a synchronization signal block (SSB) received.

The first message may indicate correspondences between different antenna groups and respective corresponding reception quality parameters. An antenna identifier number may be set for each antenna, or combination identifier numbers may be set for different antenna groups. The antenna group may be indicated by the antenna identifier number contained in the antenna group or the combination identification number of the antenna group in the first message. The first message may be one or more correspondences between one or more different antenna groups and their respective corresponding reception quality parameters.

In an example, the first message may be in the form of a sequence, for example, {SSB-RSRP, antenna group}, where SSB-PRSP represents the RSRP of the SSB measured by using the antenna group in the expression.

The UE may forward the first message to the server through the base station. Here, the server may be a base station server, a core network server, etc. and may also be a server set on a network such as a wide area network for processing the first message.

The server may determine a signal receiving condition of the UE based on the first message, and may adjust the communication network based on the first message. For example, the server may adjust a signal transmission state of the base station; may also select an antenna group suitable for the current network for the UE based on the first message, so as to reduce the load caused by the UE selecting the antenna group.

In this way, the UE reports the first message of different antenna groups and the measured reception quality parameters to the server. The first message may be used as a basis for the server to instruct the UE to select an appropriate antenna group, or to adjust the communication network, etc., thus reducing the selected antenna group that does not meet the requirements of the communication scenario and improving the communication reliability.

In an embodiment, antennas in different antenna groups are not completely the same or are completely different, and/or signal receiving paths of different antenna groups are not completely the same or are completely different.

Here, the antennas in different antenna groups may be different, or the antennas in different antenna groups may be identical but the signal receiving paths connected to the antennas are different, or the antennas in different antenna groups and the signal receiving paths connected to the antennas may be different. The antennas that may be different in different antenna groups, may be that: the number of antennas is different, and/or the selected antennas are different.

As shown in FIG. 2, one antenna group has less than or equal to N antennas, where N is less than or equal to a total number M of antennas of the UE, and M and N are positive integers. The UE may have M antennas. The UE may select antennas connected to the baseband through the switch between the antennas and the base station. Here, the number of antennas connected to the baseband may be less than or equal to N. Here, N is less than or equal to the total number M of antennas of the UE. For example, N may be a number of switch channels of the selection switch. Here, one or more antennas connected to the baseband and selected through the switch between the antennas and the base station are an antenna group.

In an example, if the UE has 6 antennas, 6 antenna groups may be formed when the number of antennas in an antenna group is 1. 15 antenna groups may be formed when the number of antennas in an antenna group is 2. 20 antenna groups may be formed when the number of antennas in an antenna group is 3.

In the radio frequency front-end block diagram shown in FIG. 4, the UE may have X signal receiving paths, where X is a positive integer greater than or equal to 1. The signal received by the antenna needs to be transmitted to the baseband through a signal receiving path composed of a filter and/or a low noise amplifier and other devices. The signal receiving path connected to each antenna may also be hand over through a switch, so that one antenna may be connected to different signal receiving paths. Different signal receiving paths have different processing capabilities for signals in different frequency bands. An antenna connected to different signal receiving paths may make the RF front-end adapt to signals in different frequency bands. Here, the antennas in the same antenna group may be identical, but the signal receiving paths connected to the antennas may be different, or the antennas in different antenna groups and the signal receiving paths connected to the antennas may be different.

In an embodiment, the method also includes:

determining, based on the received first message sent by the at least one UE, a second message that indicates at least two of the antenna groups and reception quality parameters.

The second message may indicate correspondences between different antenna groups and respective corresponding reception quality parameters. The second message may be one or more correspondences between one or more different antenna groups and their respective corresponding reception quality parameters.

The server may determine the second message based on the first message. The first message may or may not be the same as the second message.

The second message may be a result obtained by performing statistical processing on the first message. For example, for multiple first messages received, multiple reception quality parameters of the same antenna group may be averaged or weighted averaged. The correspondence between different antenna groups and the calculated reception quality parameters is determined as the second message.

Here, the first message may be the correspondence between one or more different antenna groups and reception quality parameters. The multiple first messages may be first messages respectively measured by one UE for multiple times, and/or first messages measured by multiple same UEs, respectively. Here, the same UEs may be UEs with the same antenna design.

The server may send the second message determined based on the first message to the UE. The UE may determine an antenna group from the second message based on desired reception quality parameters. The antenna group corresponding to the desired reception quality parameters is used for signal transmission. Here, the desired reception quality parameters may be optimal reception quality parameters in the second message.

The server may update the second message based on multiple first messages reported by different UEs, or multiple first messages reported by the same UE. The correspondence between antenna groups and reception quality parameters reflected in the second message is more accurate and time-sensitive. Therefore, the second message is used to determine the antenna group for signal transmission, which may improve the accuracy of selecting an antenna group and thus improve the communication quality.

In an embodiment, the method also includes:

determining, based on an indication of the first message a cell, corresponding to the first message;

determining, based on the received first message sent by the at least one UE, the second message that indicates at least two of the antenna groups and the reception quality parameters includes:

determining, based on the first message, the second message of the cell corresponding to the first message.

In different cells, the reception quality parameters measured by the same antenna group are different. The first message sent by the UE to the server may be identified by using cell identity information, and the server may determine the cell corresponding to the first message based on the cell identity information. The cell identity information may be a cell identity (ID).

In an example, the first message may be in the form of a sequence, for example, {Cell-ID, SSB-RSRP, antenna group}, where Cell-ID indicates the cell corresponding to the first message, and SSB-PRSP indicates the RSRP of the SSB measured by using the antenna group in the expression.

By using the cell identity information to identify the first message, the server may determine the cell corresponding to the first message, and may select the antenna group of the UE for the cell, or adjust the communication network to improve the pertinence of the first message.

By using the cell identity information to identify the first message, the server may determine the cell corresponding to the first message, and then determine the first message of the cell identified by the cell identity information.

In an embodiment, determining, based on the received first message sent by the at least one UE, the second message that indicates at least two of the antenna groups and the reception quality parameters includes:

determining, based on the first message, a second message that indicates at least two of the antenna groups and reception quality parameter index values, in which different quality parameter index values represent different ranges of reception quality parameters.

Usually, the values of reception quality parameters such as RSSI or RSRP are relatively discrete. For example, the reception quality parameters corresponding to different antenna groups in the second message may be different from the desired reception quality parameters. As such, it may not be possible to determine the antenna group from the second message using the desired reception quality parameters.

Here, the reception quality parameters may be quantified. The server may use the reception quality parameter index values to represent different ranges of reception quality parameters. The reception quality parameter index value may indicate reception quality parameters within a range. The UE may select a desired reception quality parameter index value according to the quality of reception quality parameters indicated by the reception quality parameter index values. For example, a reception quality parameter index value indicating an optimal reception quality parameter may be determined as a desired reception quality parameter index value. The antenna group corresponding to the optimal reception quality parameter is selected for signal transmission. Since the reception quality parameters in the second message are quantized, the situation that the antenna group cannot be determined from the first message may be reduced.

In an embodiment, the reception quality parameter index value is obtained by rounding a quotient of the reception quality parameters divided by a predetermined quantization constant.

Here, the reception quality parameter index value may be obtained by rounding the reception quality parameter divided by the predetermined quantization constant. In this way, a reception quality parameter index value indicating a certain range of reception quality parameters may be obtained.

In an embodiment, the number of antenna groups corresponding to one reception quality parameter index value is less than or equal to a preset number threshold.

If a difference between the reception quality parameters corresponding to different antenna groups is small, there may be multiple reception quality parameters indicated by the reception quality parameter index value, that is, one reception quality parameter index value may correspond to multiple antenna groups. Here, the predetermined quantization constant can be adjusted to narrow the range of reception quality parameters indicated by the reception quality parameter index value, so that the number of antenna groups corresponding to one reception quality parameter index value is less than or equal to the preset number threshold. For example, the preset quantity threshold may be 2.

In an example, as shown in Table 1, the same reception quality parameter index value, that is, one RSRP quantization value corresponds to two antenna groups, i.e., the RSRP quantization value 1 corresponds to antenna group 0 or 1. When the reception quality parameter index value selected by the UE is 1, two antenna groups may be obtained.

In this way, after the UE determines the reception quality parameter index value, the number of antenna groups available for selection is less than or equal to the preset number threshold, and the frequency for the UE to select antenna groups is reduced.

In an embodiment, receiving the first message sent by the at least one UE that indicates at least two antenna groups and the reception quality parameters includes:

receiving one or more first messages determined for one or more times and sent by at least one UE.

Due to changes in a wireless signal receiving environment, such as changes in surrounding interference conditions, etc. The reception quality parameters measured by the UE at the same location will change.

The UE may perform one or more measurements and obtain multiple first messages. The UE may send the obtained multiple first messages to the server. Here, each first message may include a relationship between different antenna groups and the measured reception quality parameters.

After receiving the multiple first messages, the server may determine, based on the multiple first messages, statistical reception quality parameters corresponding to different antenna groups in a statistical manner.

In this way, the accuracy of the server determining the reception quality parameters corresponding to different antenna groups may be improved.

In an embodiment, the method further includes, sending a second message to the UE, in which the second message is used for the UE to determine the antenna group for signal transmission.

The server may send the second message to the base station, and the base station sends the second message to the UE.

In an embodiment, sending the second message to the UE includes, sending to the UE the second message corresponding to the current cell of the UE, in which the second message is used for the UE to determine the antenna group for signal transmission in the current cell.

The first message sent by the UE may use cell identity information to identify the cell. The server may determine the second message of a different cell based on the first message of a different cell.

The server may send a second message about the current cell of the UE to the UE, and the UE may determine an antenna group suitable for the current cell based on the second message.

The server may determine the current cell of the UE based on the cell identity information used in the first message sent by the UE, or the UE may send indication information of the current cell to the server.

In an embodiment, the reception quality parameter includes: reference signal receiving powers (RSRPs).

Here, the UE may measure RSRPs corresponding to different antenna groups. The first message of different antenna groups and RSRPs are sent to the server.

RSRP is an average value of RF transmission powers of all reference signals in a passband, which is a key parameter used to indicate the strength of the wireless signal. Using RSRP as the reception quality parameter may more clearly reflect the receiving capabilities of different antenna groups.

A specific example is provided below in combination with any of the above-mentioned embodiments:

1. As shown in FIG. 2, the terminal has M receiving antennas and N baseband paths. When the number M of antennas connected to a certain frequency band is greater than the number N of processing links, the terminal may select antennas according to different scenarios.
2. a UE data collection phase T is set. The UE first selects a receiving antenna range based on the frequency band. If the number of selectable antennas is still greater than N, it first selects an antenna group by default, changes a combination mode of antennas within t time and records data of each group {cell-id, SSB-RSRP, antenna group}.
3. data of one group or n groups of the above-mentioned antenna groups is reported to the base station; the same UE continuously reports, and multiple similar UEs report for multiple times; a certain amount of user data collection is reached.
4. The base station or data server performs hierarchical quantization processing on the RSRPs in the data structure, and performs grouping or hierarchical indexing. RSRP index value=RSRP measurement value/K, where K is a quantization constant.
5. After time T, for a given cell, the base station sends a corresponding table between SSB-RSRPs and antenna groups to the UE in the cell after collecting enough data for processing. The corresponding table between SSB-RSRPs and antenna groups can be shown in Table 1. The antenna selection in 1 and 2 are stopped after the UE receives the table, and according to the above table, the UE performs antenna group selection based on the measured SSB-RSRP quantization values. The range of RSRP index values may not allow the UE to frequently select, and one RSRP index value may correspond to two antenna groups. In this way, antenna group selection may be performed twice in one cell.

Figure 6:
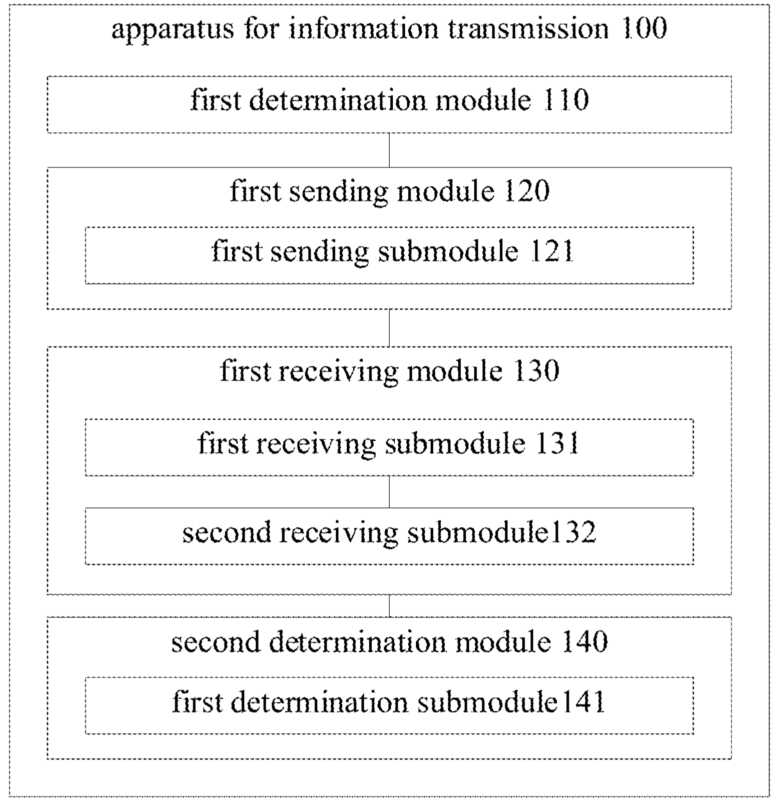
FIG. 6 is a block diagram illustrating an apparatus for information transmission according to an embodiment.

The embodiment of the disclosure also provides an apparatus for information transmission, which is applied to a data frame receiving end of wireless communication. As shown in FIG. 6, the apparatus 100 for information transmission includes: a first determination module 110 and a first sending module 120.

The first determination module 110 is configured to determine reception quality parameters for at least two antenna groups, in which each antenna group includes at least two antennas.

The first sending module 120 is configured to send a first message that indicates at least one of the antenna groups and the determined reception quality parameters.

In an embodiment, antennas in different antenna groups are not completely the same or are completely different, and/or signal receiving paths of different antenna groups are not completely the same or are completely different.

In an embodiment, the first message indicates a cell corresponding to the first message.

In an embodiment, the first sending module 120 includes:

a first sending submodule 121, configured to send one or more first messages determined for one or more times.

In an embodiment, the apparatus 100 further includes:

a first receiving module 130, configured to receive a second message that indicates at least two of the antenna groups and the reception quality parameters, in which the second message is determined based on the first message; and a second determination module 140, configured to determine, based on the second message, an antenna group for signal transmission.

In an embodiment, the first receiving module 130 includes:

a first receiving submodule 131, configured to receive a second message that indicates at least two of the antenna groups and reception quality parameter index values, in which different quality parameter index values represent different ranges of reception quality parameters.

In an embodiment, the reception quality parameter index values are obtained by rounding a quotient of the reception quality parameters divided by a predetermined quantization constant.

In an embodiment, the first receiving module 130 includes:

a second receiving submodule 132, configured to receive the second message of a current cell;

the second determination module 140 includes:

a first determination submodule 141, configured to determine, based on the second message of the current cell, the antenna group for signal transmission in the current cell.

In an embodiment, the reception quality parameters include: reference signal received powers (RSRPs).

Figure 7:
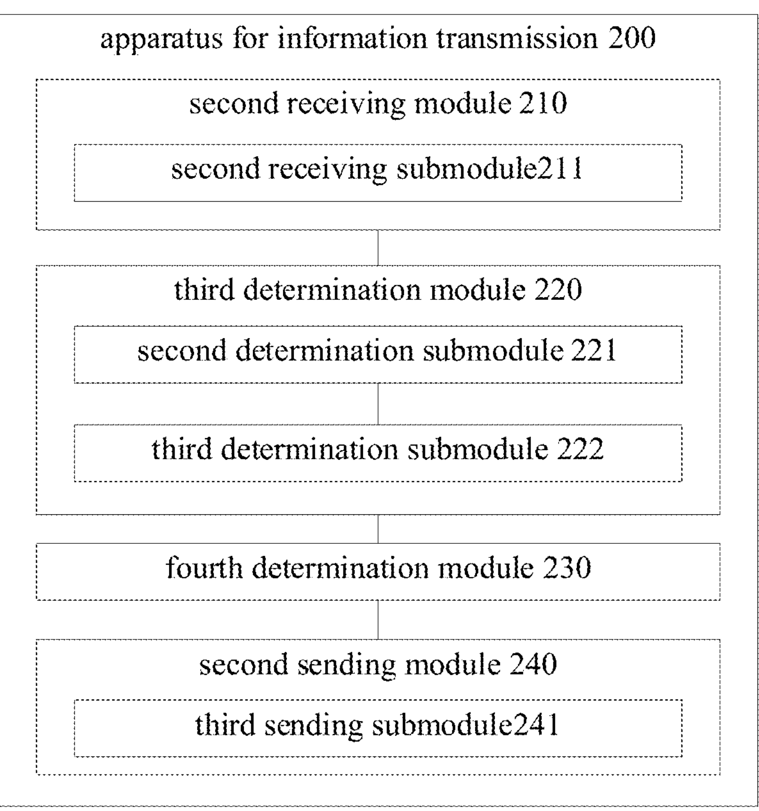
FIG. 7 is a block diagram illustrating another apparatus for information transmission according to an embodiment.

The embodiment of the disclosure also provides an apparatus for information transmission, which is applied to a server. As shown in FIG. 7, the apparatus 200 for information transmission includes: a second receiving module 210.

The second receiving module 210 is configured to receive a first message sent by at least one user equipment (UE) that indicates at least two antenna groups and reception quality parameters, in which each antenna group includes at least two antennas.

In an embodiment, antennas in different antenna groups are not completely the same or are completely different, and/or signal receiving paths of different antenna groups are not completely the same or are completely different.

In an embodiment, the apparatus 200 further includes:

a third determination module 220, configured to determine, based on the received first message sent by the at least one UE, a second message that indicates at least two of the antenna groups and the reception quality parameters.

In an embodiment, the apparatus 220 further includes:

a fourth determination module 230, configured to determine a cell corresponding to the first message based on an indication of the first message;

the third determination module 220 includes:

a second determination submodule 221, configured to determine, based on the first message, the second message of the cell corresponding to the first message.

In an embodiment, the third determination module 220 includes:

a third determination submodule 222, configured to determine, based on the first message, a second message that indicates at least two of the antenna groups and reception quality parameter index values, in which different quality parameter index values represent different ranges of reception quality parameters.

In an embodiment, the reception quality parameter index values are obtained by rounding a quotient of the reception quality parameters divided by a predetermined quantization constant.

In an embodiment, the second receiving module 210 includes:

a second receiving submodule 211, configured to receive one or more first messages determined for one or more times and sent by the at least one UE.

In an embodiment, the apparatus 200 further includes:

a second sending module 240, configured to send a second message to the UE, in which the second message is used for the UE to determine an antenna group for signal transmission.

In an embodiment, the second sending module 240 includes:

a second sending submodule 241, configured to send to the UE the second message corresponding to a current cell of the UE, in which the second message is used for the UE to determine the antenna group for signal transmission in the current cell.

In an embodiment, the reception quality parameters include: reference signal received powers (RSRPs).

In an embodiment, the first determination module 110, the first sending module 120, the first receiving module 130, the second determination module 140, the second receiving module 210, the third determination module 220, the fourth determination module 230, the second sending module 240, etc. may be implemented by one or more central processing units (CPUs), graphic processing units (GPUs), baseband processors (BPs), application specific integrated circuits (ASICs), DSPs, programmable logic devices (PLDs), complex programmable logic devices (CPLDs), field-programmable gate array (FPGAs), general-purpose processors, controllers, microcontroller units, microprocessors, or other electronic components, and configured to execute the above methods.

Figure 8:
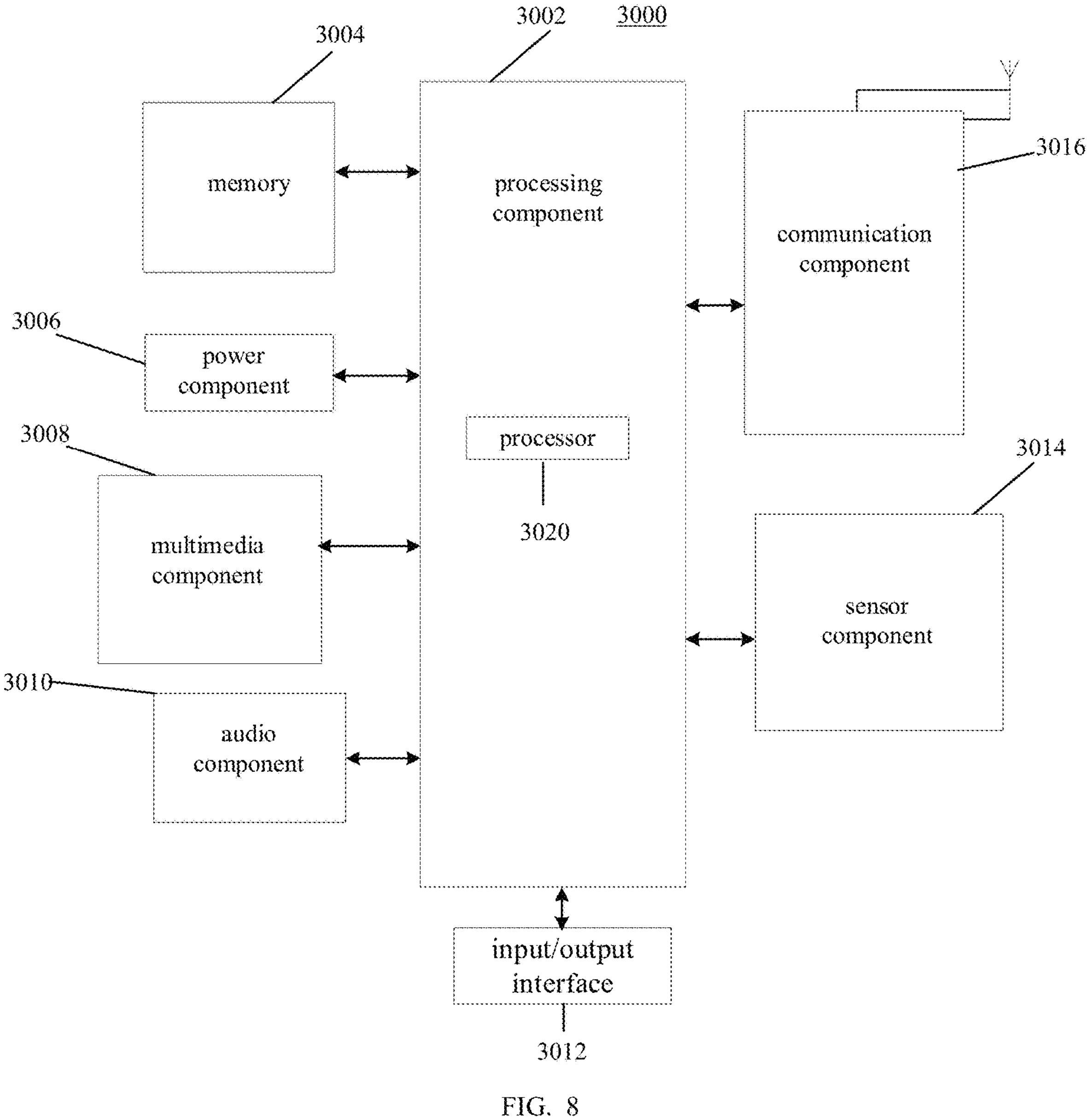
FIG. 8 is a block diagram illustrating a device for information transmission according to an embodiment.

FIG. 8 is a block diagram illustrating a device 3000 for transmitting information according to an embodiment. For example, the device 3000 may be a mobile phone, a computer, a digital broadcasting terminal, a message sending and receiving equipment, a game controller, a tablet device, a medical device, a fitness equipment, a personal digital assistant or the like.

As illustrated in FIG. 8, the device 3000 may include one or more of: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3002 to execute instructions to perform all or part of the steps in the above described methods. Moreover, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000 for performing contraction data, phonebook data, messages, pictures, video, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 is configured to provide power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front camera and/or a rear camera. The front camera and the rear camera may receive an external multimedia datum while the device 3000 is in an operation mode, such as an adjustment mode or a video mode. Each of the front camera and the rear camera may be a fixed optical lens system or have focus and optical zoom capability.

The audio component 3010 is configured to output and/or input audio signals. For example, the audio component 3010 includes a microphone ("MIC") for receiving an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 is configured to provide an interface between the processing component 3002 and peripheral interface modules, such as a keyboard, a click wheel, buttons, and the like. The buttons may include, but be not limited to, a home button, a volume button, a starting button, and a locking button.

The sensor component 3014 includes one or more sensors for providing status assessments of various aspects of the device 3000. For example, the sensor component 3014 may detect an open/closed status of the device 3000, relative positioning of components, e.g., the display and the keypad of the device 3000, a change in position of the device 3000 or a component of the device 3000, a presence or absence of user contraction with the device 3000, an orientation or an acceleration/deceleration of the device 3000, and a change in temperature of the device 3000. The sensor component 3014 may include a proximity sensor for detecting the presence of nearby objects without any physical contact. The sensor component 3014 may also include a light sensor, such as a CMOS (complementary metal-oxide-semiconductor)) or a CCD (charge coupled device) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 may access a wireless network based on a communication standard, such as Wi-Fi, 2G, or 3G, or a combination thereof. In an embodiment, the communication component 3016 receives a broadcast signal or broadcast associated information from an external broadcast management system via a broadcast channel. In an embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the device 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an embodiment, there is also provided a non-transitory computer readable storage medium including instructions, such as the memory 3004 including the instructions. The instruction may be executed by the processor 820 in the device 3000 for performing the above methods. For example, the non-transitory computer readable storage medium may be a ROM, a RAM, a CD-ROM, a magnetic tape, a floppy disc, an optical data storage device, and the like.

According to the method and apparatus for information transmission, the communication device, and the storage medium in the embodiments of the disclosure, the UE determines the reception quality parameters of at least two antenna groups, where each antenna group includes at least two antennas, and sends a first message that indicates at least one of the antenna groups and the determined reception quality parameters. In this way, the UE reports the first message of different antenna groups and the measured reception quality parameters to the server. The first message may be used as a basis for the server to instruct the UE to select an appropriate antenna group, or to adjust a communication network, etc., thus reducing the selected antenna group that does not meet the requirements of the communication scenario and improving the communication reliability.

Other implementations of the disclosure may be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art.

It should be understood that the disclosure is not limited to the exaction construction that has been described above and illustrated in the accompanying drawings, and that various modifications and changes may be made without departing from the scope.

What is claimed is:

1. A method for information transmission, performed by a user equipment (UE), the method comprising:

determining reception quality parameters for antenna groups, wherein each antenna group comprises at least two antennas;

sending a first message that indicates at least one of the antenna groups and the reception quality parameters;

receiving a second message that indicates at least two of the antenna groups and calculated reception quality parameters, wherein the second message is determined by performing statistical processing on a plurality of first messages received; and determining, based on the second message, an antenna group for signal transmission, wherein receiving the second message that indicates at least two of the antenna groups and the calculated reception quality parameters comprises:

receiving a second message that indicates at least two of the antenna groups and reception quality parameter index values, wherein different reception quality parameter index values represent different ranges of reception quality parameters.

2. The method according to claim 1, wherein the first message indicates a cell corresponding to the first message.

3. The method according to claim 1, wherein sending the first message that indicates at least one of the antenna groups and the reception quality parameters comprises:

sending one or more first messages determined for one or more times.

4. The method according to claim 1, wherein each reception quality parameter index value is obtained by rounding a quotient of each reception quality parameter divided by a predetermined quantization constant.

5. The method according to claim 1, wherein receiving the second message that indicates at least two of the antenna groups and the calculated reception quality parameters comprises:

receiving the second message of a current cell;

wherein determining, based on the second message, the antenna group for signal transmission comprises:

determining, based on the second message of the current cell, the antenna group for signal transmission in the current cell.

6. The method according to claim 1, wherein the reception quality parameters comprise reference signal receiving powers (RSRPs).

7. A method for information transmission, applied to a server, the method comprising:

receiving at least one first message sent by at least one user equipment (UE) that indicates at least one of antenna groups and reception quality parameters, wherein each antenna group comprises at least two antennas; and determining a second message that indicates at least two of the antenna groups and calculated reception quality parameters, by performing statistical processing on a plurality of first messages received from the UE, wherein determining the second message comprises:

determining, based on the first message, a second message that indicates at least two of the antenna groups and reception quality parameter index values, wherein different reception quality parameter index values represent different ranges of reception quality parameters; and sending to the UE, the second message that indicates the at least two of the antenna groups and the reception quality parameter index values.

8. The method according to claim 7, further comprising:

determining a cell corresponding to the first message based on an indication of the first message;

wherein determining, based on the received first message sent by the at least one UE, the second message that indicates at least two of the antenna groups and the calculated reception quality parameters comprises:

determining, based on the first message, the second message of the cell corresponding to the first message.

9. The method according to claim 7, wherein each reception quality parameter index value is obtained by rounding a quotient of each reception quality parameter divided by a predetermined quantization constant.

10. The method according to claim 7, wherein receiving the at least one first message sent by the at least one UE that indicates at least one of the antenna groups and the reception quality parameters comprises:

receiving one or more first messages determined for one or more times and sent by the at least one UE.

11. The method according to claim 7, further comprising, sending a second message to the UE, wherein the second message is used for the UE to determine an antenna group for signal transmission.

12. The method according to claim 11, wherein sending the second message to the UE comprises, sending to the UE the second message corresponding to a current cell of the UE, wherein the second message is used for the UE to determine the antenna group for signal transmission in the current cell.

13. The method according to claim 7, wherein the reception quality parameters comprise reference signal receiving powers (RSRPs).

14. A communication device, comprising at least one processor, and a memory stored with an executable program, wherein when the executable program is run by the at least one processor, the at least one processor is configured to:

determine reception quality parameters for antenna groups, wherein each antenna group comprises at least two antennas;

send a first message for indicating at least one of the antenna groups and the reception quality parameters receive a second message that indicates at least two of the antenna groups and calculated reception quality parameters, wherein the second message is determined by performing statistical processing on a plurality of first messages received; and determine, based on the second message, an antenna group for signal transmission, wherein receiving the second message that indicates at least two of the antenna groups and the calculated reception quality parameters comprises:

receiving a second message that indicates at least two of the antenna groups and reception quality parameter index values, wherein different reception quality parameter index values represent different ranges of reception quality parameters.

* * * * *